United States Patent
Cunningham, III et al.

(10) Patent No.: US 9,405,172 B2
(45) Date of Patent: Aug. 2, 2016

(54) WEARABLE MOUNT FOR HANDHELD IMAGE CAPTURE DEVICES

(71) Applicants: Frazier Cunningham, III, Belleville, MI (US); Cindita Cunningham, Belleville, MI (US)

(72) Inventors: Frazier Cunningham, III, Belleville, MI (US); Cindita Cunningham, Belleville, MI (US)

(*) Notice: Subject to any disclaimer, the term of this patent is extended or adjusted under 35 U.S.C. 154(b) by 0 days.

(21) Appl. No.: 14/740,790

(22) Filed: Jun. 16, 2015

(65) Prior Publication Data

US 2015/0362824 A1    Dec. 17, 2015

Related U.S. Application Data

(60) Provisional application No. 62/012,473, filed on Jun. 16, 2014.

(51) Int. Cl.
| | | |
|---|---|---|
| *G03B 17/00* | (2006.01) | |
| *G03B 17/56* | (2006.01) | |
| *H04N 5/225* | (2006.01) | |

(52) U.S. Cl.
CPC ............ *G03B 17/561* (2013.01); *H04N 5/2251* (2013.01)

(58) Field of Classification Search
CPC .................................................... G03B 17/561
USPC ......................................................... 396/423
See application file for complete search history.

(56) References Cited

U.S. PATENT DOCUMENTS

| 2,702,836 | A | 2/1955 | Duncan | |
|---|---|---|---|---|
| 5,884,198 | A | 3/1999 | Kese et al. | |
| 6,832,099 | B2 | 12/2004 | Twigg et al. | |
| 7,722,264 | B2* | 5/2010 | Kao | G03B 17/00 396/419 |
| 2005/0157182 | A1* | 7/2005 | Gonzales | F16M 13/04 348/208.99 |
| 2005/0176480 | A1 | 8/2005 | Kemp | |
| 2007/0164987 | A1 | 7/2007 | Graham | |
| 2008/0070641 | A1 | 3/2008 | Wang | |
| 2010/0123776 | A1* | 5/2010 | Wydeven | H04N 7/183 348/77 |
| 2011/0085041 | A1* | 4/2011 | Kildevaeld | H04N 7/181 348/158 |
| 2012/0046083 | A1 | 2/2012 | Klett | |
| 2014/0049636 | A1* | 2/2014 | O'Donnell | G08C 17/02 348/143 |

FOREIGN PATENT DOCUMENTS

JP    04092542    3/1992

* cited by examiner

*Primary Examiner* — Clayton E LaBalle
*Assistant Examiner* — Dennis Hancock
(74) *Attorney, Agent, or Firm* — Vincent Re PLLC

(57) ABSTRACT

A wearable mount is disclosed for holding a portable electronic image capture device. The mount includes a base mount comprising an abutment portion configured securely attach the base mount, a cradle assembly attaching to the portable electronic image capture device, and a flexible arm connecting the base mount to the cradle assembly and permitting the user to adjust an orientation of the portable electronic image capture device.

8 Claims, 10 Drawing Sheets

WEARABLE MOUNT FOR HANDHELD IMAGE CAPTURE DEVICES

CROSS REFERENCE TO RELATED APPLICATIONS

This disclosure is claims the benefit of U.S. Provisional Application No. 62/012,473 filed on Jun. 16, 2014 which is hereby incorporated by reference.

TECHNICAL FIELD

This disclosure is related to a wearable mount for handheld image capture devices and other similar electronic and mechanical devices.

BACKGROUND

The statements in this section merely provide background information related to the present disclosure. Accordingly, such statements are not intended to constitute an admission of prior art.

Portable electronic image capture devices have made the recording and communication of information and events part of everyday life. Many users of such devices utilize both of their hands or arms to make use of the devices, especially as the device size and weight increases, and depending on the information or event that the user wishes to record or communicate. Some users who are disabled may wish to more effectively or efficiently use their portable electronic devices.

Stands or mounts of various types can help a user to better or more efficiently use their portable electronic or mobile communications device by freeing one or both of the user's hands to manipulate the device, or by acting as another hand or arm such that a disabled user can more easily manipulate the device. However, such stands may be unwieldy, or may not allow for utilization of some or all of the functions the user wishes to utilize. Furthermore, such stands may not be able to be manipulated in certain ways, or set and locked in certain orientations, which the user may desire.

Moreover, some users may wish to utilize such a stand with extra features that enhance the functionality of the portable electronic or mobile communications device.

SUMMARY

A wearable mount is disclosed for holding a portable electronic image capture device. The mount includes a base mount comprising an abutment portion configured securely attach the base mount, a cradle assembly attaching to the portable electronic image capture device, and a flexible arm connecting the base mount to the cradle assembly and permitting the user to adjust an orientation of the portable electronic image capture device.

BRIEF DESCRIPTION OF THE DRAWINGS

One or more embodiments will now be described, by way of example, with reference to the accompanying drawings, in which.

DETAILED DESCRIPTION

The wearable mount disclosed herein is a hands-free mount or stand that can hold a tablet computer, smartphone, or other electronic or mobile communications or computing device in an infinite number of variations, depending on the desires of the user. The user will be able to wear the invention on their person and record information or events without having to hold their device. The wearable mount disclosed herein will allow the user to move with the action and adjust the view of an event, while still being able to pay close attention to or simply enjoy the event. The wearable mount allows for easier and more efficient use in crowded venues or events in which the user needs to constantly reposition their device to capture the moment.

The wearable mount is designed to be worn by a user around the waist or slung across the chest, among other configurations. It is envisioned that attachment means for the wearable mount could allow the mount to be worn around the wrist, arm or leg, or slung from the neck. It is further envisioned that various attachment means could allow for other configurations. The design of the wearable mount allows for its user to position it at any level on the body, to the left or right side of the user, or even in front of or behind the user.

Figure 1:
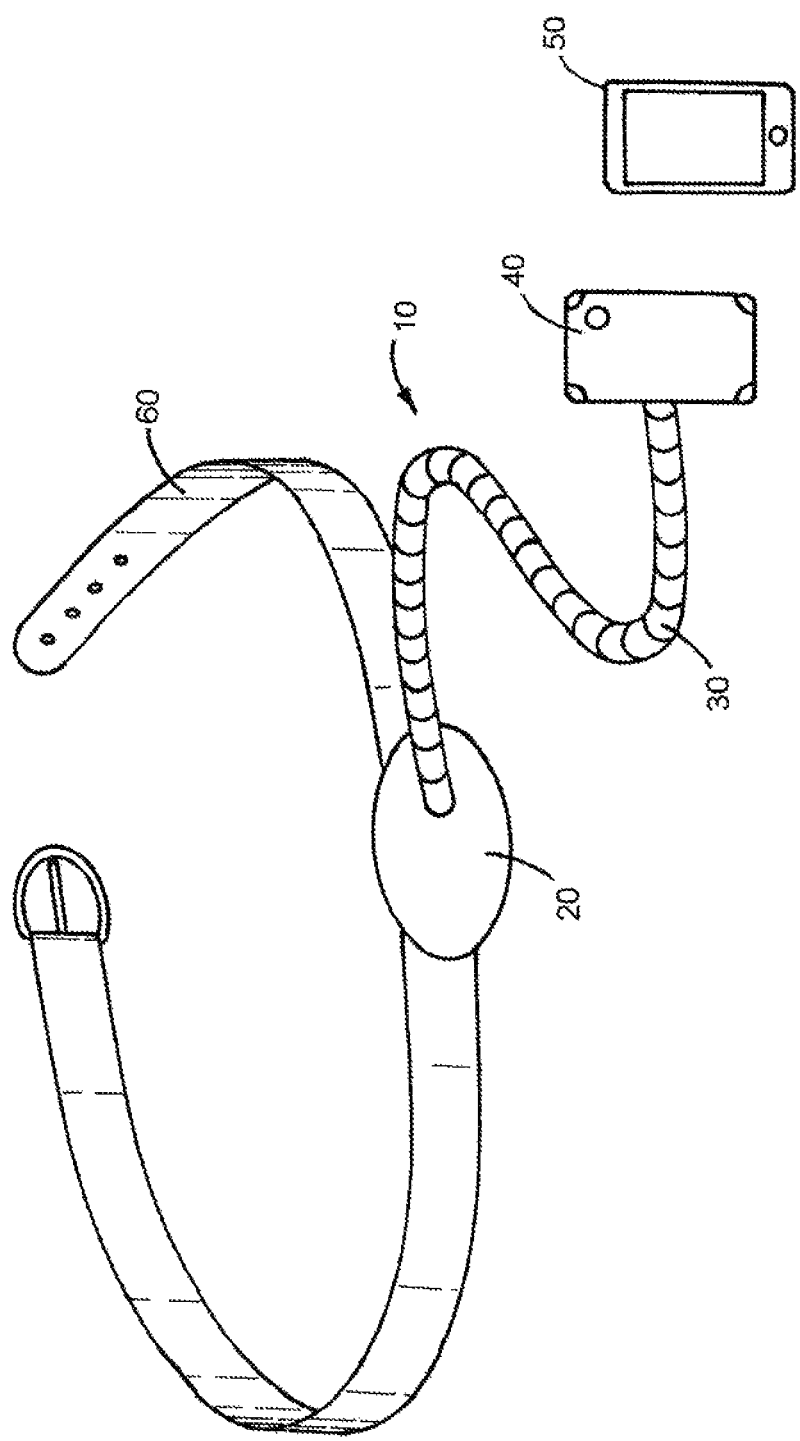
FIG. 1 illustrates an exemplary embodiment of a belt-wearable mount for portable electronic image capture devices, in accordance with the present disclosure.

Referring now to the drawings, wherein the showings are for the purpose of illustrating certain exemplary embodiments only and not for the purpose of limiting the same, FIG. 1 illustrates an exemplary embodiment of a belt-wearable mount for portable electronic image capture devices. Wearable mount 10 is illustrated including base mount 20 configured to attach to belt 60, flexible arm 30, and cradle assembly 40 configured to selectively hold portable electronic and mobile communications device 50. Base mount 20 includes a flat or slightly curved abutment portion configured to rest against the user or in this case the belt of the user.

Figure 2:
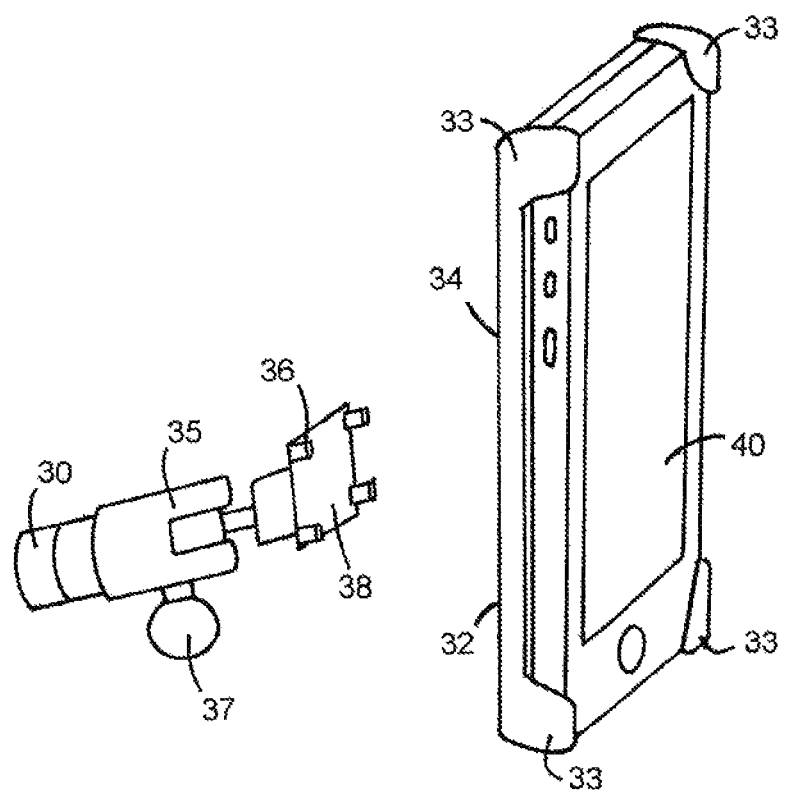
FIG. 2 illustrates attachment of the mobile communications device to the flexible arm of the mount of FIG. 1, in accordance with the present disclosure.

FIG. 2 illustrates attachment of the mobile communications device to the flexible arm of the mount of FIG. 1. Flexible arm 30 is illustrated including ball and socket connection 35 and attachment plate 38. The exemplary attachment plate 38 is illustrated including four exemplary attachment tabs 36 configured to be gripped to by features 34 on cradle assembly 32. Any attachment mechanism known in the art can be used to attach cradle assembly 32 to flexible arm 30 can be utilized. Some can be adjustable and some can be fixed. Some can permit rotation. The disclosure is not intended to be limited to the particular attachment mechanism illustrated. Ball and socket connection 35 can optionally include screw mechanism 37 permitting a user to tighten or loosen the socket connection and thereby secure or adjust an orientation of the held device 40. The exemplary cradle assembly 32 includes four pocket grips 33, each pocketing a corner of device 40 to secure the device, although any attachment mechanism can be used to securely hold device 40 within cradle assembly 32.

Flexible arm 30 can include any of a number of flexible portions or sections permitting adjustment of the arm. In one embodiment, the flexible arm can include a gooseneck section known in the art, including a plurality of annular segments, each segment including a narrow portion and a wide portion. A narrow portion on one segment is fitted within the wide portion of another segment, with the segments being slightly adjustable against each other, with a plurality of segments joined to each other in this way in a chain.

Figure 3:
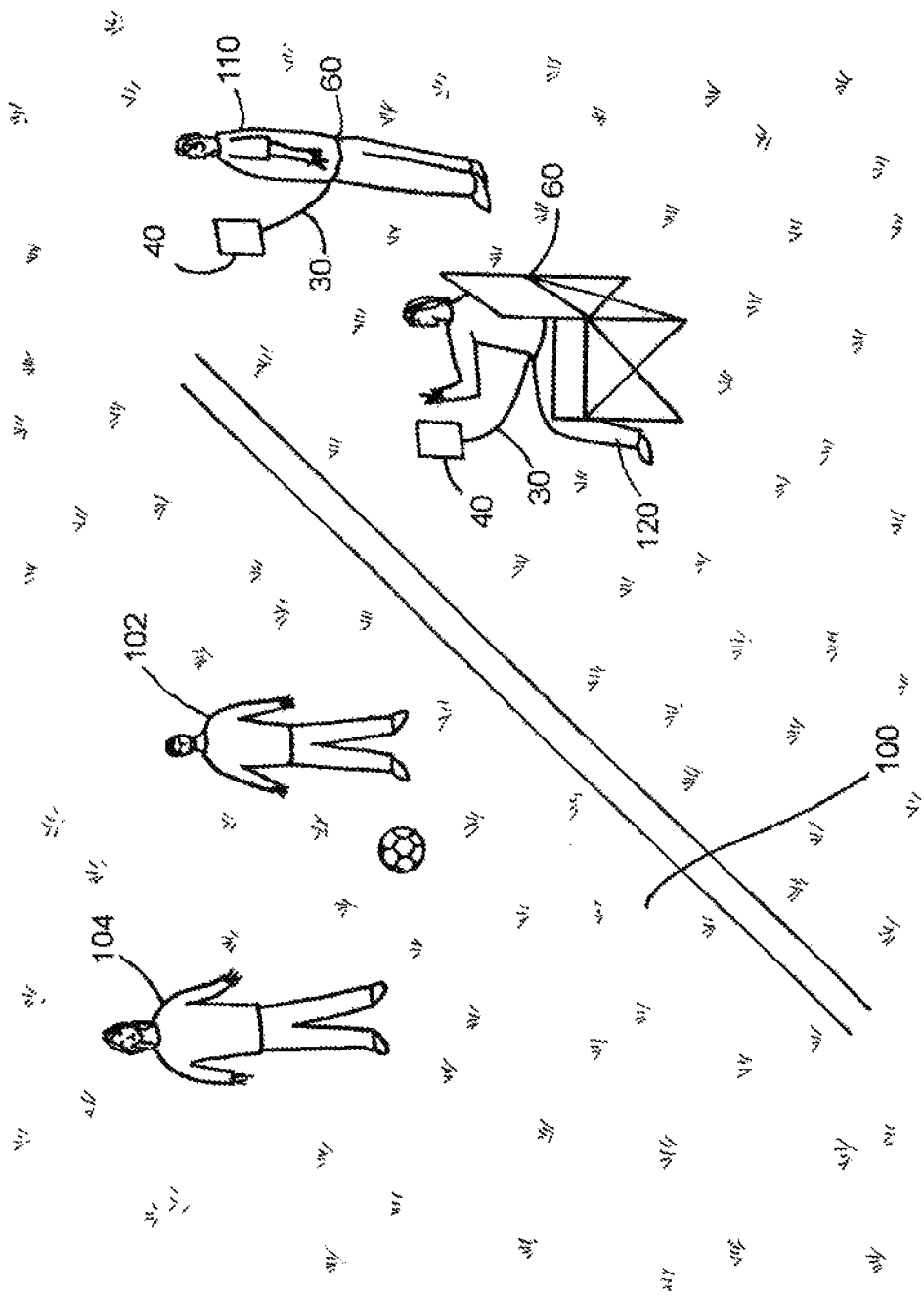
FIG. 3 illustrates two exemplary persons utilizing the belt-wearable mount to capture images of a sporting event, in accordance with the present disclosure.

FIG. 3 illustrates two exemplary persons utilizing the belt-wearable mount to capture images of a sporting event. A first user 110 is illustrated standing, wearing belt 60 with a flexible arm 30 protruding therefrom for attachment of device 40. A second user 120 is illustrated sitting, wearing belt 60 with a flexible arm 30 protruding therefrom for attachment of device 40. Through use of the disclosed mount, users 110 and 120 can clap and cheer players 102 and 104 playing soccer on playing surface 100 while the wearable mounts permit users 110 and 120 to capture images or video of the action.

Figure 4:
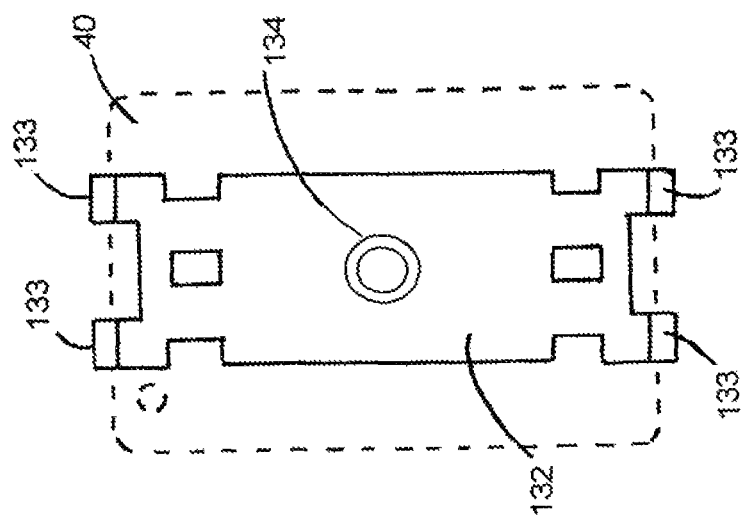
FIG. 4 illustrates an exemplary alternative mechanism for attaching a device to the flexible arm, in accordance with the present disclosure.

FIG. 4 illustrates an exemplary alternative mechanism for attaching a device to the flexible arm. Cradle assembly 132 is illustrated including feature 134 for attachment of a flexible arm to the assembly and device gripping features 133 for attachment of device 40 to the cradle assembly 132. Feature 134 includes exemplary female threading for permitting an arm with matching male threading to be screwed into place.

Figure 5:
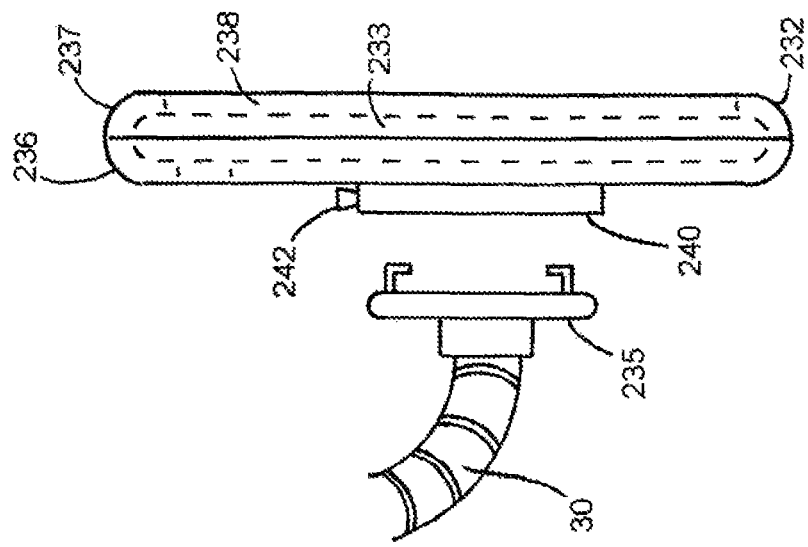
FIG. 5 illustrates an additional exemplary alternative mechanism for attaching a device to the flexible arm, in accordance with the present disclosure.

FIG. 5 illustrates an additional exemplary alternative mechanism for attaching a device to the flexible arm. A clamshell cell phone case is illustrated as an exemplary cradle assembly 232 including a first half 236 and a second half 237, the halves snapped together to protect the device. Cradle assembly 232 includes cavity 233 configured to hold a particular device and open window section 238 to permit a user to interact, for example, with a touch screen of the device. Flexible arm 30 is illustrate attached to a non-rotating attachment plate 235 for attachment to feature 240 of cradle assembly 232. Spring loaded button 242 is provided for releasing cradle assembly 232 from arm 30.

Figure 6:
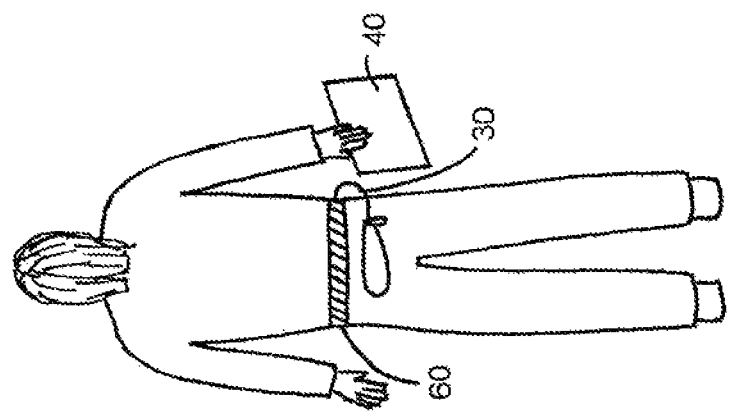
FIG. 6 illustrates a user bending the flexible arm of the mount of FIG. 1 behind the user when not in use and the user holding the device separately from the mount, in accordance with the present disclosure.

FIG. 6 illustrates a user bending the flexible arm of the mount of FIG. 1 behind the user when not in use and the user holding the device separately from the mount. Flexible arm 30 is attached to belt 60 through a base mount. When not in user, arm 30 can be bent behind the user to be stowed away. In this example, the user has disconnected device 40 from arm 30 for use separate from the disclosed mount.

Figure 7:
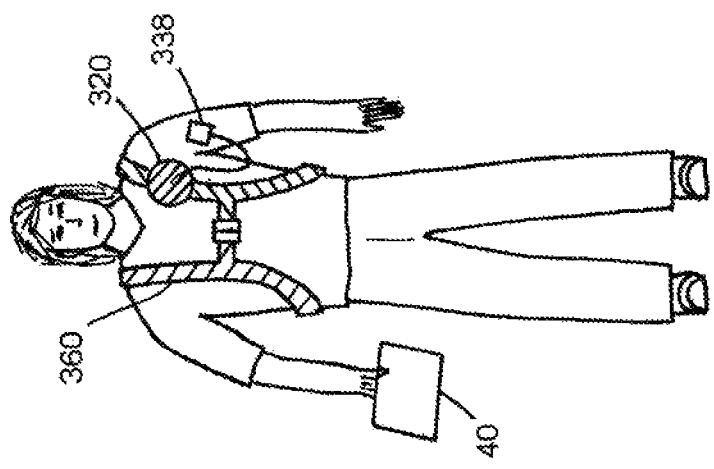
FIG. 7 illustrates a user wearing an exemplary alternative shoulder harness-wearable mount for portable electronic image capture devices, in accordance with the present disclosure.

FIG. 7 illustrates a user wearing an exemplary alternative shoulder harness-wearable mount for portable electronic image capture devices. A user is shown wearing a shoulder harness device 360. A base mount 320 is attached to the shoulder harness device 360. Attachment plate 338 is illustrated attached to a flexible arm connected to base mount 320, such that the user can attach device 40 to the flexible arm as desired.

Figure 8:
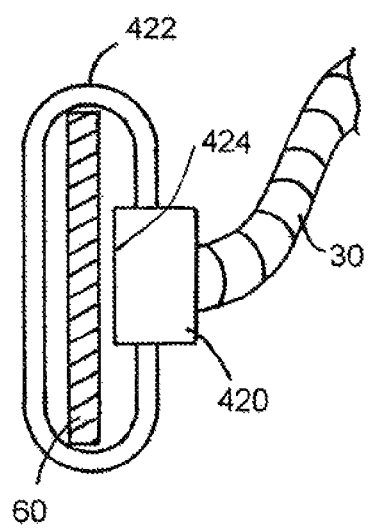
FIG. 8 illustrates an exemplary flexible arm and base mount attached to a belt through a tension strap looped around the belt, in accordance with the present disclosure.

FIG. 8 illustrates an exemplary flexible arm and base mount attached to a belt through a tension strap looped around the belt. Base mount 420 including abutment portion 424 is illustrated attached to belt 60. Tension strap 422 is illustrated, ready to be tightened securely against belt 60. According to one embodiment of the disclosed mount, flexible arm 30 can be made stable by securely tightening tension strap 422 against belt 60 and belt 60 against the user. Abutment portion 424 serves to steady arm 30 by securely clamping against the belt 60 which is in turn securely strapped to the user. The moment generated by the weight of the arm 30 and the attached device are countered by the tension straps 422 securely holding the abutment portion 424 against the belt 60.

Figure 9:
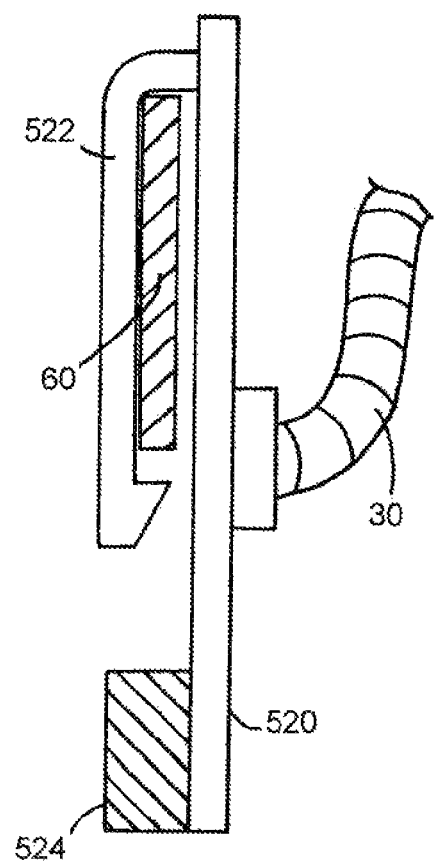
FIG. 9 illustrates an exemplary flexible arm and base mount attached to a belt through a retention hook and lower stabilization portion of the base mount, in accordance with the present disclosure.

FIG. 9 illustrates an exemplary flexible arm and base mount attached to a belt through a retention hook and lower stabilization portion of the base mount. Base mount 520 including abutment portion 524 and hook portion 522 affixed to belt 60 is illustrated. Abutment portion 524 can include a dense pad or exemplary closed cell foam material configured for comfort of the wearer while still providing relatively rigid support of the base plate 520 against the user and therefore providing stability in the attached device. Abutment portion 524 acts as a cantilever portion for base mount 520, transferring weight of the arm and the attached device against the body of the user, with the device pivoting around the belt 60. This cantilever portion steadies the device. A relatively longer distance of abutment portion 524 extending below belt 60 provides for increased stability. Hook portion 522 can be replaced by any attachment strap, snap feature, or other affixing device known in the art attaching the base mount to the belt.

Figure 10:
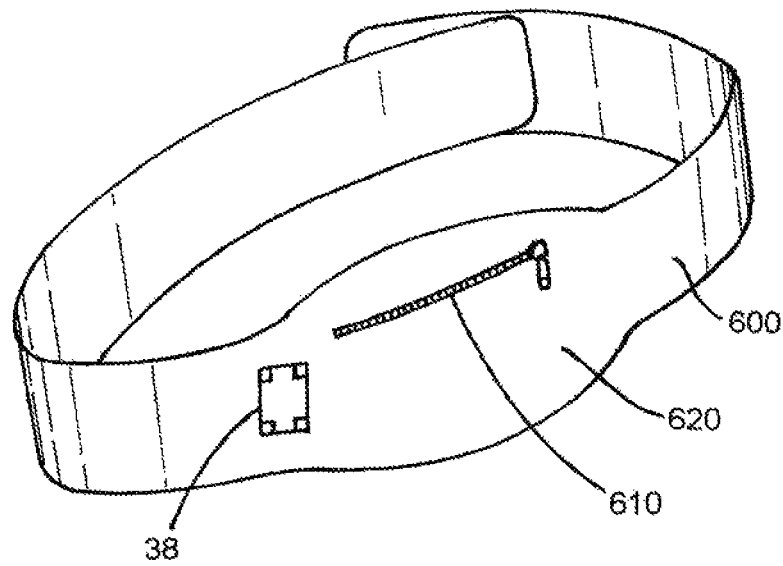
FIG. 10 illustrates an exemplary retractable flexible camera arm device installed to a fanny pack, in accordance with the present disclosure.

FIG. 10 illustrates an exemplary retractable flexible camera arm device installed to a fanny pack. Mount 600 is illustrated including a fanny pack 620 including an opening pocket 610 and attachment plate 38 located upon an exterior of the pack 620. Attachment plate 38 is attached to a retractable flexible arm that can be located within fanny pack 620.

Figure 11:
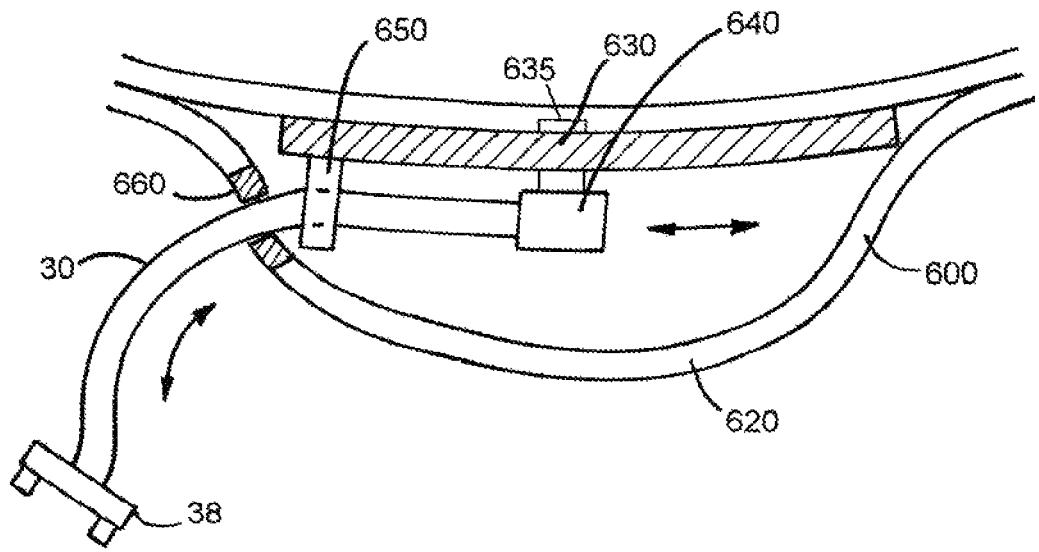
FIG. 11 illustrates the retractable flexible camera arm device of FIG. 10, including a schematic illustration of a sliding carrier and bearing mechanism to facilitate selective extension and retraction of the arm, in accordance with the present disclosure.

FIG. 11 illustrates the retractable flexible camera arm device of FIG. 10, including a schematic illustration of a sliding carrier and bearing mechanism to facilitate selective extension and retraction of the arm. A number of alternative mechanisms for providing a retractable flexible arm within a fanny pack are envisioned. According to the non limiting example of FIG. 11, mount 600 is illustrated including fanny pack 620, flexible arm 30, and rigid base mount 630 attached to an inside surface of the fanny pack. Sliding carrier 640 is attached to base mount 630 through an exemplary tab and groove design, where a tab 635 on sliding carrier 640 is retained within a groove or slot formed on base mount 630. A bearing fixture 650 is illustrated affixed to base mount 630, holding the flexible arm 30 and stabilizing where the arm 30 extends out of the fanny pack 620. A reinforced hole 660 can be provided on the fanny pack 620 to prevent wear upon the fabric of the pack where the arm 30 exits the pack. Attachment plate 38 is illustrated attached to flexible arm 30.

Figure 12:
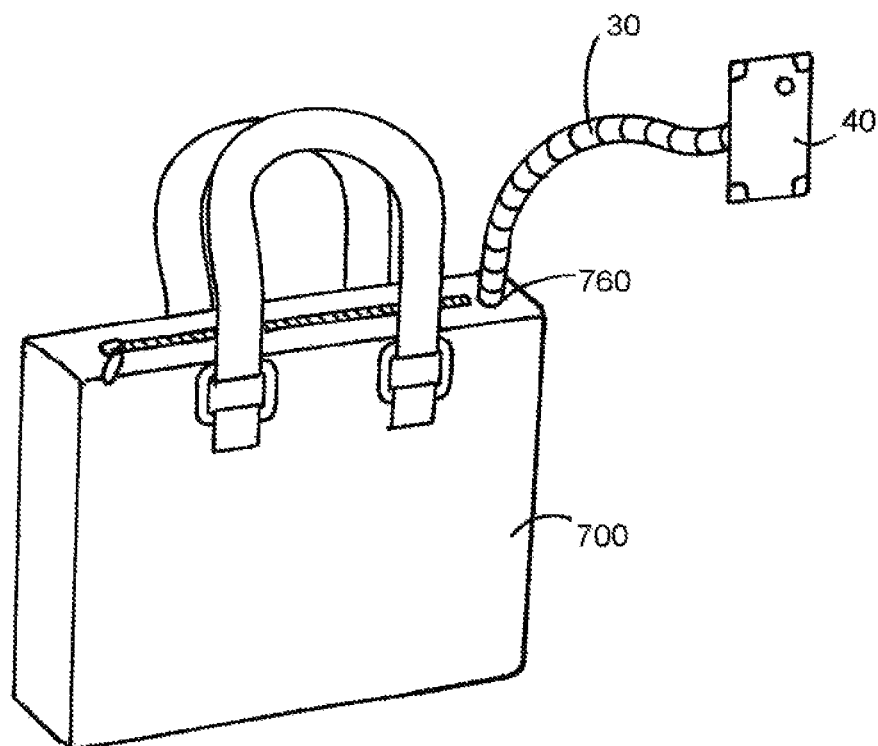
FIG. 12 illustrates an exemplary handbag equipped with a flexible camera arm device, in accordance with the present disclosure.

FIG. 12 illustrates an exemplary handbag equipped with a flexible camera arm device. Handbag 700 includes a mount permanently attached to the handbag. A base mount is located within the bag and securely sewn or otherwise affixed to a portion of the handbag, for example, against a bottom surface of the bag. Flexible arm 30 is illustrated attached to the base mount within the handbag and extending from the handbag at exit point 760. In another embodiment, arm 30 can extend from within a zipper of the handbag, such that the arm can be stowed away within the zipper without being seen when stowed. Device 40 is illustrated attached to arm 30.

Figure 13:
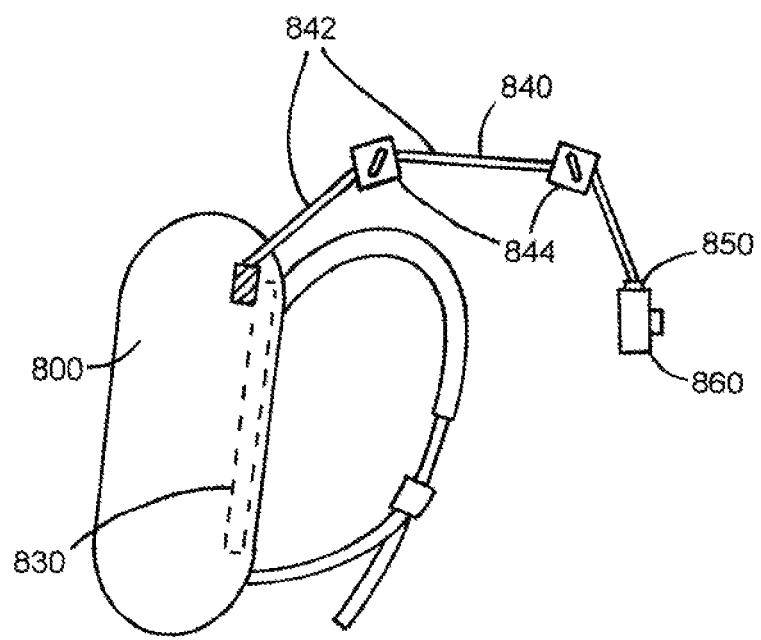
FIG. 13 illustrates an exemplary backpack equipped with a flexible camera arm device, in accordance with the present disclosure.

FIG. 13 illustrates an exemplary backpack equipped with a flexible camera arm device. Backpack 800 is illustrated including base mount 830 attached to an inside portion of backpack 800, flexible arm 840 including rigid arm portions 842 connected by tightening joints 844, and digital camera device 860 attached to arm 840 through attachment plate 850.

Figure 14:
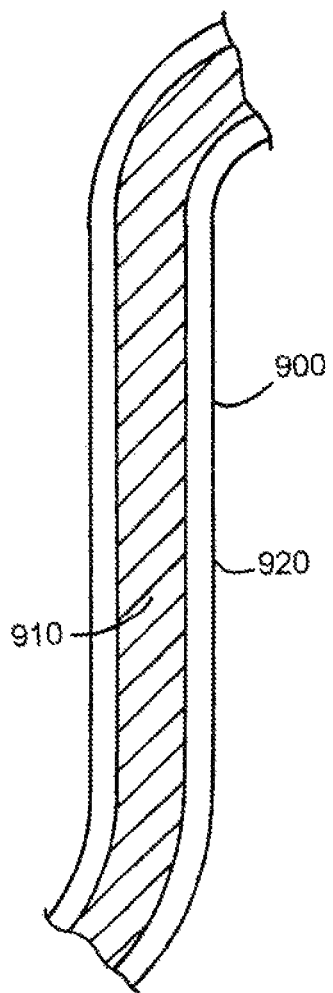
FIG. 14 illustrates an exemplary alternative embodiment of a flexible arm comprising a flexible twisted wire with a rubberized coating, in accordance with the present disclosure.

FIG. 14 illustrates an exemplary alternative embodiment of a flexible arm comprising a flexible twisted wire with a rubberized coating. As an alternative to the gooseneck arm illustrated elsewhere in the disclosure, flexible arm 900 can include a coiled wire 910 coated with a rubberized coating 920. Any number of flexible arm mechanisms known in the art can be used with the disclosed mount, and the disclosure is not intended to be limited to the particular examples provided herein.

Figure 15:
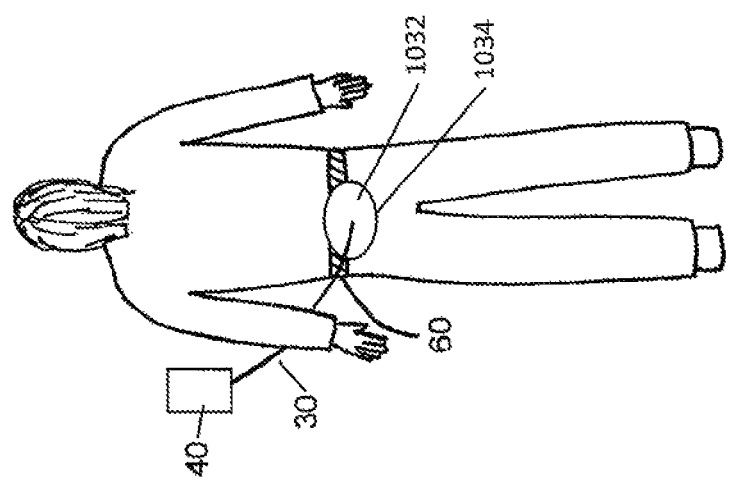
FIG. 15 illustrates a mount including a base mount configured to be worn in back of the user, in accordance with the present disclosure.

The disclosed mount, when attached to a belt, can be worn at any position around the waistline of the wearer. FIG. 15 illustrates a mount including a base mount configured to be worn in back of the user. A user wearing belt 60 is illustrated. Base plate 1032 is illustrated connected to belt 60 at a back of the user. Base plate 1032 includes a lower portion acting as a cantilever portion, such as is disclosed in relation to FIG. 9, providing enhanced stability to flexible arm 30 and the attached device 40. Such a base mount configured for a back of the user can be particularly flat and can include, for example, a right angle connection or a side mount connection for the flexible arm, such that as little of a protrusion on the back of the user is maintained. In this way, the user can sit in a chair or a car with the back-aligned mount without significant discomfort.

In some embodiments, the cradle assembly of the disclosed embodiment is constructed or coated with materials that prevent an inserted tablet, smartphone or other device, from shifting, moving or slipping out of the cradle. In other embodiments, only the base mount is coated with anti-slip material to further stabilize the base mount against the belt, harness, or clothes of the wearer.

Figure 16:
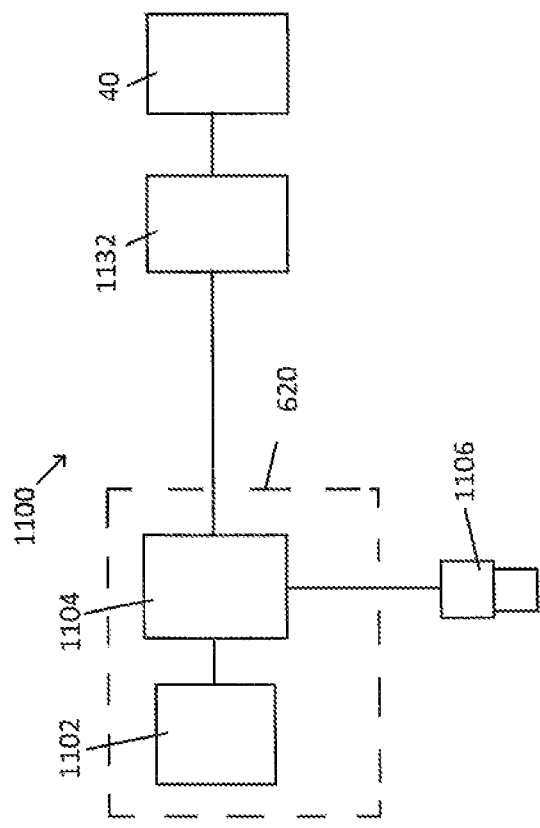
FIG. 16 is a block diagram illustrating operation of an exemplary mount including a USB charging port, in accordance with the present disclosure.

In some embodiments, the cradle assembly will include an optional USB charging port at its base. FIG. 16 is a block diagram illustrating operation of an exemplary mount including a USB charging port. Mount 1100 is illustrated installed to fanny pack 620. A control module or circuit board 1104 is illustrated including hardware and programming configured to operate at least basic code related to receiving a power input from USB connector 1106 and using that power to either charge battery device 1102 and/or device 40 through cradle assembly 1132 which includes a connector device known in the art for plugging into device 40. Other operations that can be supported by circuit board 1104 include charging device 40 with electrical power stored upon battery device 1102, transferring data to and from device 40, for example, through USB connector 1106 or onto a connected removable storage device such as a mini or micro-SD card that can be connected to circuit board 1104. USB connector 1106 can attach to a port located within or on fanny pack 620, or USB connector 1106 can be permanently attached to mount 1100, for example, with a length of electrical wire and can be situated upon fanny pack 620 for easy storage within a zippered compartment of the fanny pack 620. Exemplary circuit boards are known in the art and include RAM, memory for storage of programming or code used by the circuit board, and various input and output modules for carrying out the various functions of the circuit board.

The disclosure has described certain preferred embodiments and modifications of those embodiments. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. A wearable mount for holding a portable electronic image capture device, the mount comprising:
 a fanny pack including at least one strap configured to wrap around a waist of a user;
 a base mount affixed within and stationary in relation to the fanny pack;
 a sliding carrier configured to move horizontally along a length of the base mount;
 a cradle assembly attaching to the portable electronic image capture device; and
 a flexible arm connecting the sliding carrier to the cradle assembly and permitting the user to adjust an orientation of the portable electronic image capture device;
 wherein movement of the sliding carrier along the length of the base mount enables the flexible arm to be either extended from the fanny pack or retracted within the fanny pack.

2. The wearable mount of claim 1, wherein the flexible arm comprises a gooseneck device.

3. The wearable mount of claim 1, wherein the flexible arm comprises a rubber-coated flexible wire.

4. The wearable mount of claim 1, wherein the cradle assembly comprises a cell phone case that can be detached from the flexible arm.

5. The wearable mount of claim 1, wherein the cradle assembly is attached to the flexible arm through a ball and socket joint.

6. The wearable mount of claim 5, wherein the ball and socket joint can be tightened to secure the cradle assembly in a particular orientation.

7. The wearable mount of claim 1, wherein the cradle assembly is permanently affixed to the flexible arm; and
 wherein the cradle assembly can selectively release the portable electronic image capture device.

8. The wearable mount of claim 1, wherein the cradle assembly includes a circuit board in electronic communication with the portable electronic image capture device for a purpose selected from charging a battery of the portable electronic image capture device and transferring data to and from the portable electronic image capture device.

* * * * *